Feb. 28, 1928.

E. F. HAUSERMAN ET AL 1,660,646

METAL PARTITION

Filed Oct. 22, 1920

3 Sheets-Sheet 1

Inventors
Earl F. Hauserman,
Leroy D. Mowery,
Walter R. McClenaghan and
Thomas E. Murrell.
By Day, Oberlin & Day
Attorneys

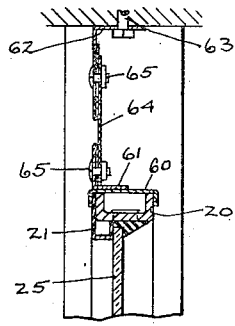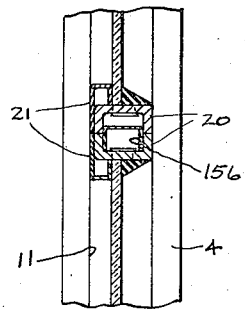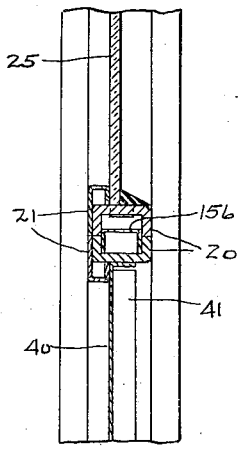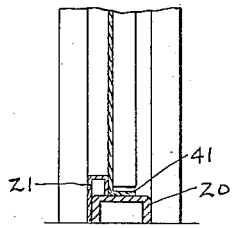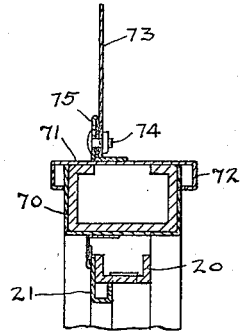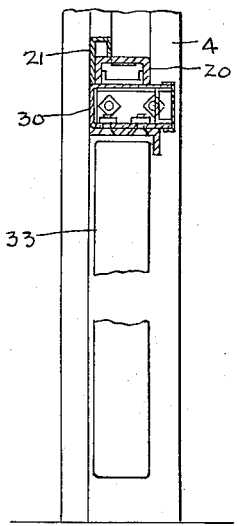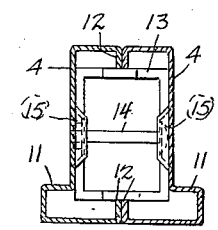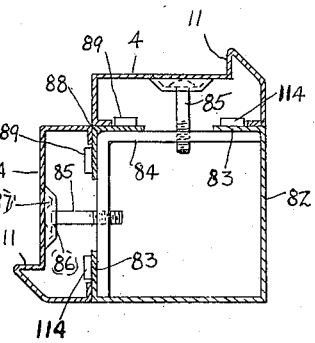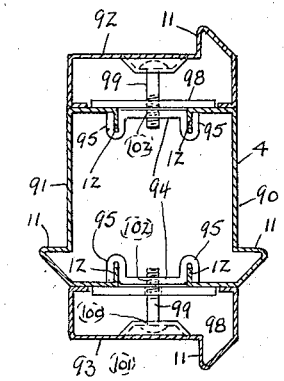

Feb. 28, 1928.
E. F. HAUSERMAN ET AL
1,660,646
METAL PARTITION
Filed Oct. 22, 1920   3 Sheets-Sheet 3
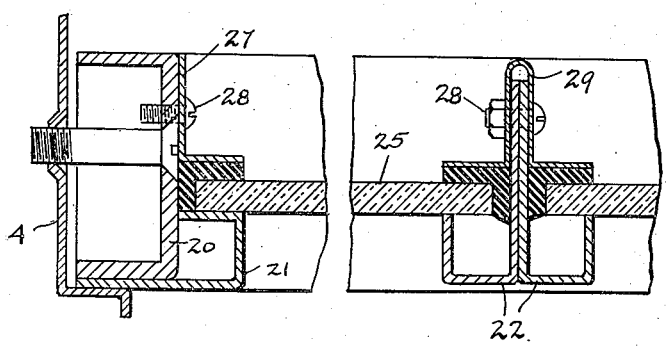
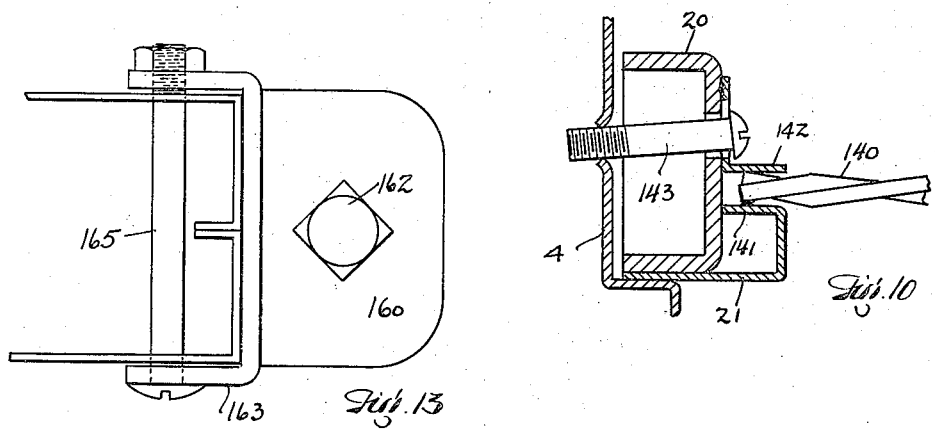
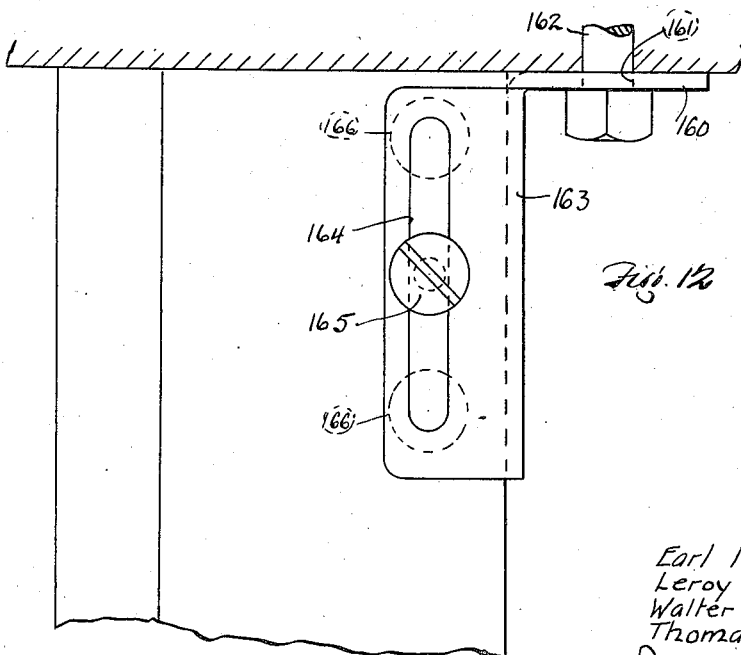
Inventors
Earl F. Hauserman,
Leroy D. Mowery,
Walter R. McClenaghan and
Thomas E. Murrell.
By Fay, Oberlin & Fay
Attorneys Patented Feb. 28, 1928.

1,660,646

UNITED STATES PATENT OFFICE.

EARL F. HAUSERMAN, OF CLEVELAND HEIGHTS, AND LEROY D. MOWERY, OF CLEVELAND, OHIO, AND WALTER R. McCLENAGHAN AND THOMAS E. MURRELL, OF DETROIT, MICHIGAN, ASSIGNORS TO THE E. F. HAUSERMAN COMPANY, OF CLEVELAND, OHIO, A CORPORATION OF OHIO.

METAL PARTITION.

Application filed October 22, 1920. Serial No. 418,749.

The present invention relates to partition walls made up of standard units which may be readily assembled without cutting. The partitions are formed of units of standard sizes, each section comprising a series of panels which may be changed or varied as required. Door sections are also preformed, these taking the place of certain standard units and of two or more standard sizes of panels in such units. Provision is made whereby the units and panels may be interchanged or varied, the whole fitting and interlocking together so that in erecting, it is only necessary to bolt the units together when in place. The bolts or other holding means for the various units are entirely concealed when the partition is erected making a neat appearing, strong unit. Provision is made for various heights and for filling in at the sides so that the partition is a unitary structure when completed. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
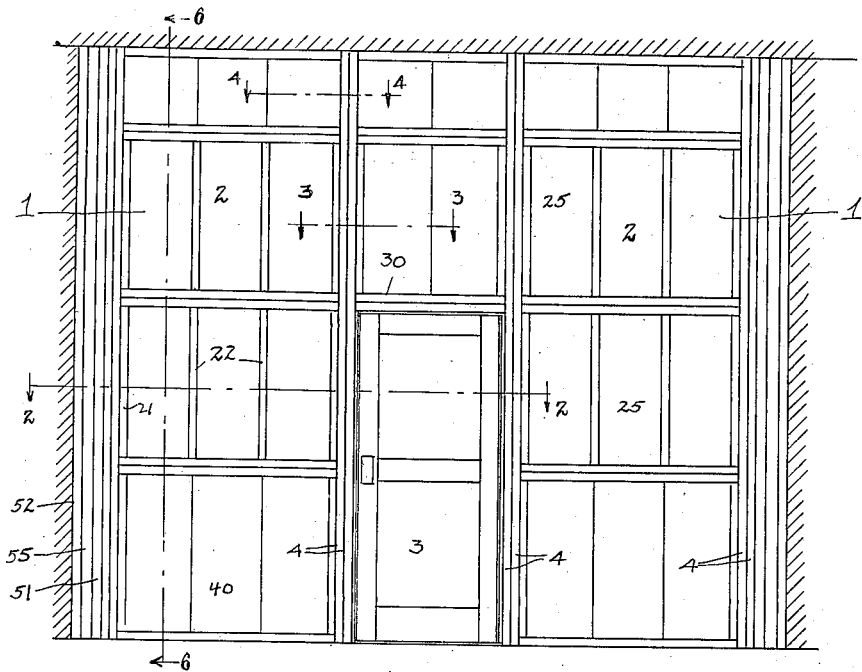
Figure 2:
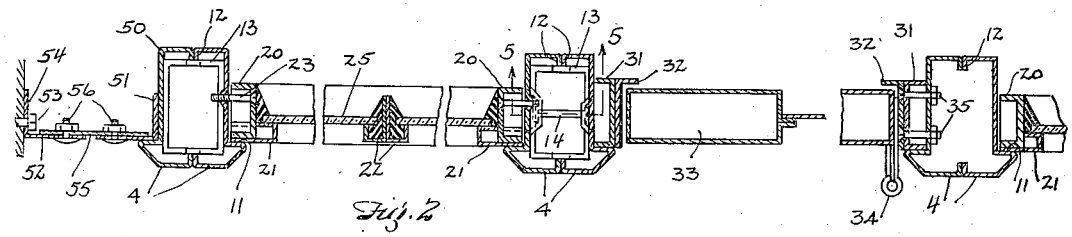
Figure 3:
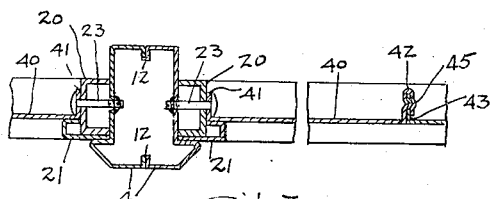
Figure 4:
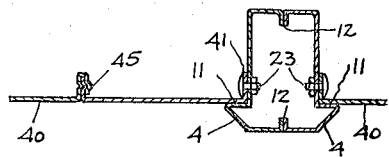
Figure 5:
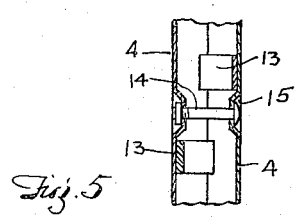

Fig. 1 is a front elevation of a partition showing the use of a plurality of units; Figs. 2, 3 and 4 are horizontal sections taken on the lines 2—2, 3—3 and 4—4, respectively, of Fig. 1; Fig. 5 is a section on the line 5—5 of Fig. 2 showing the method of joining the uprights; Fig. 6 is a vertical section on the line 6—6 of Fig. 1; Fig. 7 is a vertical section through the door but showing a modified form of cornice construction; Figs. 8 and 9 are sections through two forms of corner post construction; Fig. 10 is a section of a detail showing the construction of a wire or screen panel; Fig. 11 is a detail showing the use of glass stops; Figs. 12 and 13 are details showing the construction of the adjustable feet for attaching the uprights to the floor and ceiling; Fig. 14 is an enlarged section through a post; and Fig. 15 is a section similar to Fig. 5 but showing a modified construction.

The present partition as shown in Fig. 1 comprises three units, the two outer units 1 being entirely composed of panels 2 while the central section has a door 3. The number of units comprising a partition will of course vary as will the size of panels. Each unit comprises two half uprights 4, connected by the panels 2. As shown, units are made up of panels of either two or three lights of glass width, but the usual standard units are made in two, three and four glass widths which, with the fillers, is sufficient to take care of all usual requirements.

Each unit has at the sides an upright 4, the upright being formed with a shoulder 11 at the innerside near the forward face and having the open ends 12 bent inwardly to form an inwardly extending flange. Spaced at regular intervals along the uprights, and welded or otherwise secured thereto, are short channel sections 13 which extend slightly beyond the bent ends 12 and fit snugly against the same. In placing two uprights together to form a finished post or column the extending portions of the channel sections 13 on each upright overlap the flange 12 of the other upright and these channel sections 13 are either placed all on one upright as shown in Fig. 15, or are placed on the two uprights in staggered relation as shown in Fig. 5, thus interlocking the two uprights together. To secure the uprights together bolts 14 are employed, the bolt heads and nuts lying in bent-in portions 15 of the uprights so as to form a flush surface without projections.

Each panel has a frame formed of channel members 20 having muntin bars 21 either formed integrally or made up of separate pieces securely fastened together, the panel being of a size to receive two or more lights of glass. The vertical divisions for the glass consists of a muntin bar 22 which is riveted or welded to the top and bottom frame members. The channels 20 with the bars 21 and 22 are adapted to fit snugly between the uprights and against the shoulders 11, and the panels are held in place by means of bolts 23 which fit into threaded apertures in the uprights. The units of two uprights and panels are usually completed before the glazing is done and thus the bolt heads are covered by the putty or glass stops when the structure is finished as clearly shown in Figs. 2 and 11.

Where it is not desired to putty the glass into the frames, the usual muntin bars 21 and 22 are used, as shown in Fig. 11. Here the usual frames and muntin bars are employed, the glass sections 25 being set against the muntin bars and the edges covered with a filler of putty or the like. Angle glass stops 27 are then placed over the filler and bolted to the casing as at 28. The interior stops 29 fit over the vertical frame members 22, the bolts 28 passing through the double stop and the vertical frame member. Where full metal panels are to be used instead of glass, the same outer frame of channels and muntin bars are employed but sheet metal sections 40 are used, the sections having flanges 41 which are held to the channels by the same bolts 23 which secure the channels to the uprights. At the joints between metal sections 40, one plate has a double or rebent flange 42, while the adjacent plate has a straight flange 43 fitting between the portions of flange 42. These flanges are secured together by means of bolts not shown or they are pressed in spots as at 45 to secure them against movement. These panels of metal are of sufficient size to fit the standard frames, taking the place of glass and muntin bars. Where wire panels are employed the usual frames are used with the muntin bars 21, against which the sections 140 of screen or mesh are placed, as best shown in Fig. 10. These sections are spot welded to the muntin bars as at 141, and then angle members 142 are placed on the frames and spot welded thereto or secured by bolts 143 to cover the edges of the screening and make a neat secure joint.

As shown in Fig. 6, between the horizontal channel members of each two adjacent frames, a removable channel 156 is mounted which is higher than the channel of the frames and acts as an interlocking member to stiffen and align the frames of each unit.

The door unit is similarly made of two uprights 4 provided with a cross rail 30 at the height of the top cross member of the second panel. Attached to these two uprights are two channel members 31 having door strikes 32 welded thereto and acting as the stops for the door 33 which is swung from hinges 34 carried by one of the channels. These channels and strikes are secured to the uprights by bolts 35 which extend through aligned apertures in the strikes, channels and uprights, the heads of the bolts being countersunk to make a smooth outer surface, as best shown in Fig. 2. The door is shown of the height of two panels and of the standard width of a two-sash panel, but may be of various heights and widths, as required.

Where necessary to fill out space at the sides of a section so as to make a tight joint with the wall, a filler plate is used, the end upright being added to make a post 50 and then having an angle plate 51 bolted thereto, the plate fitting snugly adjacent the shoulder of the post. A similar angle plate 52 is then fitted against the wall and held thereagainst by bolts 53 passing through the flange 54 of the plate. A flat plate 55 is then fitted against the two angle plates and secured thereto by bolts 56. Where very little space is to be filled the two angle plates may be overlapped eliminating the plate 55. This gives sufficient adjustment to fill in, as the various panel sizes make large fillers unnecessary. At the top of the partition, that is, between the upper panels and the ceiling, a filler panel is employed and the upper frame member of the top panel is provided with a cap 60 having an angle 61 welded thereto. A similar angle 62 is fastened to the ceiling by bolts 63 and the filler panel 64 is adjustably attached to the angles 61 and 62 by means of bolts 65, passing through holes in the angles and aligned slots in the panel, as best shown in Fig. 6. This allows the filler panel to be removed in order to cut and fit around pipes, sprinkler systems, or other obstructions.

In Fig. 7 a modified top construction is shown in which the upper panel is provided with a cornice 70, having a cap 71 formed with square re-bent ends 72 fastened thereto. This cap 71 may have welded thereon an angle plate 75 which carries an adjustable filler plate 73 by means of bolts 74. This construction is usually employed where it is desired to have a space between the partition and ceiling, and the filler plate may be employed when it is desired to fill in to the ceiling.

In Fig. 8 a two way corner post construction is shown consisting of two standard uprights 4 having the usual shoulders 11 for the panels. These two uprights are connected by an angle upright 82 which has flanges 83 lying adjacent the inturned flanges of the uprights. This upright makes a square post each side being equal to the length of the long side of one of the uprights 4. To secure the two uprights 4 and the upright 82 together, a series of angle clips 84 are employed. Each clip fits the interior of the uprights 4 and extends to the upright 82. Bolts 85 are then passed through suitable apertures 86 in depressed zones 87 in the uprights 4 and these bolts are received in tapped apertures 87 in the clips. The flanges 83 of the angle upright have spacing lugs 114 which act as positioning stops for the inturned flanges of the upright 4 so that the various uprights align themselves and may be easily put together.

A filler angle 88 is adapted to fit the corner between the clip and the uprights and is provided with spacing stops 89.

In Fig. 9 a four way corner post is shown which comprises four standard uprights, 90, 91, 92 and 93. Two of these uprights 90 and 91 are turned toward each other with the shoulders 11 in alignment but spaced apart. This spacing is accomplished by the use of spacing clips 94. These clips have double re-bent portions 95 leaving grooves 96 which receive the inturned flanges 12 of the uprights. The other two uprights 92 and 93 just cover the ends of the uprights 90 and 91 and the clips. These uprights 92 and 93 are spaced by means of flat bars 98 which fit over the clips and between the inturned flanges of uprights 92 and 93. Bolts 99 are then passed through apertures 100 in depressed zones 101 of the uprights 92 and 93 and these bolts extend through apertures 101 in the bars 98 and have threaded connections with apertures 102 in the clips 94 to tie the entire post together. This same construction is used where a three way post is employed but either upright 92 or 93 is removed and the bar 98 is made continuous to cover the space between uprights 90 and 91.

For the uprights an adjustable foot is employed which may be employed both at the floor and at the ceiling but the upright is usually bolted securely to the floor foot and the top used for adjustment. This foot, as shown in Figs. 12 and 13, consists of a plate 160 having an aperture 161 to receive a bolt 162 to secure it to the ceiling or floor. This plate is formed integrally with, or rigidly secured to, a channel member 163 which fits around the upright. In each side member of the channel a slot 164 is cut and a bolt 165 passed through this slot and a suitable aperture in the upright to hold the upright in its vertical position. Where no adjustment is desired, two bolts 166 are usually used and the slots may be dispensed with and replaced by suitable apertures.

In erecting, the units are usually formed by attaching the lowest panel or kick plate to the two uprights, and several of these sections may be attached together on the floor and then set into vertical position. The panels of glass, wire mesh, or all metal are fitted into place after the entire partition is erected. Door units are usually completed and set up as a completed unit, although this is not necessary. It will be understood that the parts are so made as to fit each other and in erecting it is only necessary to bolt the uprights and panels together and then glaze the required panels. After erection the various panels may be removed and metal or mesh filled panels used in place of glass panels. The fillers for the top and sides are so arranged as to make it necessary to have only three standard width panels, of two, three or four lights wide, and the panels are of two heights, one approximately half as high as the other. The various parts of each unit are bolted and interlocked together but are so arranged that the bolts within the partition proper are concealed and only those bolts in the fillers and used for attaching to the walls show, thus making a neat, smooth finished construction. All bolts are easily removable and the construction employed gives a finished appearance to both sides of the partition.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention.

1. In partition construction, the combination of a plurality of sections, each section having two channel shaped uprights, said uprights having their outer ends rebent inwardly to form inturned flanges, the uprights of one section fitting against the uprights of adjacent sections to form closed posts, means on said uprights adapted to overlap such inturned flanges to align said uprights, and means for removably securing said adjacent uprights together.

2. In partition construction, the combination of uprights formed of channel sections having a shoulder and formed with the open ends bent inwardly, two of said uprights being fitted together to form a post with the rebent ends adjacent each other, channel plates rigidly secured to said uprights and having the ends of the channel plates extending beyond and in contact with the rebent ends of the upright channels to prevent movement of said uprights and bolts passing through said uprights to hold them tightly against each other in aligned position.

3. In partition construction, the combination of a plurality of sections, each section being provided with two uprights, the uprights of adjacent sections being fitted together to form posts, each upright being a channel section with the outer ends rebent inwardly and said rebent ends being adapted to be adjacent each other in the post, a series of channel plates rigidly secured to the interior of said uprights and having their ends in contact with and extending beyond the rebent ends of said uprights to prevent relative movement of said uprights past each other, and bolts spaced between each pair of plates to secure said uprights together.

4. In partition construction, the combination of a plurality of sections, each section comprising two uprights of channel section and having a shoulder, the outwardly extending ends of the channel being turned inwardly to form flanges, adjacent uprights of two sections being fitted against each other to form closed posts, a series of channel plates secured to the interior of said uprights and extending adjacent to and beyond the inturned flange portions of the uprights to maintain the uprights in alignment, and bolts for securing the uprights together, each section being provided with a series of panels adapted to fit between said two uprights and against said shoulders, and bolts operable after adjacent uprights are secured together to removably hold said panels in place.

5. In partition construction, a unit section comprising two open uprights fitting against uprights of adjacent sections to form closed posts, said uprights having a shoulder extending toward the interior of the section, and removable panels adapted to fit between said upright and against said shoulders, said panels having frame portions of channel members opening outwardly, bolts adapted to secure said panels to said uprights and channel bars adapted to be inserted between each two adjacent horizontal channel members of the frame, these channel bars fitting snugly within the frame channels and overlapping the same to align said panels and to stiffen the unit.

6. In partition construction, a unit section comprising two open uprights fitting against uprights of adjacent sections to form closed posts, said uprights each having a shoulder extending toward the interior of the section, and removable panels adapted to fit between said upright and against said shoulders, said panels having frame portions of channel members and being provided with muntin bars, and bolts adapted to pass through said frame channels to secure said panels to said uprights, said panels being adapted to be attached to said uprights before glazing, the glazing putty being adapted to cover such securing bolts to hide the same in the finished unit.

7. In partition construction, the combination of a plurality of removable sections, each section comprising two uprights of channel section adapted to fit against the uprights of adjacent sections to form hollow closed posts, and a plurality of interchangeable panels removably attached to the uprights of each section and removable therefrom after said sections are connected, means for interlocking adjacent uprights to align the same, bolts for securing adjacent uprights together to form closed posts, and bolts for securing said panels to said uprights.

8. In partition construction, the combination of a plurality of removable sections, each section comprising two uprights of channel section adapted to fit against the uprights of adjacent sections to form hollow closed posts, and a plurality of interchangeable panels removably attached to the uprights of each section and removable therefrom after said sections are connected, means for interlocking adjacent uprights to align the same, bolts for securing adjacent uprights together to form closed posts, bolts for securing said panels to said uprights, and means for interlocking the adjacent horizontal edges of said panels together.

9. In partition construction, a four-way corner post comprising four spaced uprights, two of said uprights being spaced away from each other and being secured in position by means of clips, the other two uprights fitting the ends of said first uprights and said clips, and means for securing said second two uprights to said clips to bind said four uprights together to form a post.

10. In partition construction, a four-way corner post, comprising four spaced uprights of channel form having inturned flanges along their open edges, two of said uprights being spaced in vertical alignment apart from each other, and clips interlocking with such inturned flanges of said two spaced uprights to secure them in their spaced aligned relation, the other two uprights fitting the ends of said first two uprights and said clips, and means for removably securing said latter two uprights to said clips to bind said four uprights together to form a rigid post.

This application signed by me this 20th day of September, 1920.

EARL F. HAUSERMAN.

This application signed by me this 20th day of September, 1920.

LEROY D. MOWERY.

This application signed by me this 20th day of October, 1920.

WALTER R. McCLENAGHAN.

This application signed by me this 20th day of October, 1920.

THOMAS E. MURRELL.